United States Patent [19]

Teramachi

[11] Patent Number: 5,554,899
[45] Date of Patent: Sep. 10, 1996

[54] ELECTRIC ACTUATOR

[75] Inventor: Hiroshi Teramachi, Tokyo, Japan

[73] Assignee: THK Co., Ltd., Tokyo, Japan

[21] Appl. No.: 224,576

[22] Filed: Apr. 7, 1994

[30] Foreign Application Priority Data

Apr. 10, 1993 [JP] Japan .................................. 5-107763

[51] Int. Cl.⁶ .................................................. H02K 7/06
[52] U.S. Cl. ................................ 310/80; 310/20; 310/37; 414/735
[58] Field of Search ................................ 310/20, 37, 80, 310/83; 414/735, 749

[56] References Cited

U.S. PATENT DOCUMENTS

| | | | |
|---|---|---|---|
| 4,501,981 | 2/1985 | Hansen | 310/49 R |
| 4,509,408 | 4/1985 | Kuroda | 92/2 |
| 4,801,240 | 1/1989 | Hautau et al. | 414/735 |
| 5,023,466 | 6/1991 | Isozumi | 290/48 |
| 5,053,670 | 10/1991 | Kosugi | 310/328 |
| 5,139,383 | 8/1992 | Polyak et al. | 414/3 |
| 5,300,848 | 4/1994 | Huss et al. | 310/83 |
| 5,378,141 | 1/1975 | Aoki | 425/589 |

FOREIGN PATENT DOCUMENTS 62-165057  7/1987  Japan .

*Primary Examiner*—Steven L. Stephan
*Assistant Examiner*—Elvin G. Enad
*Attorney, Agent, or Firm*—Armstrong, Westerman, Hattori, McLeland & Naughton

[57] ABSTRACT

An electric actuator which is used for e.g. an arm of an industrial robot includes a composite shaft having a ball screw groove and a ball spline groove, a hollow motor through which the composite shaft extends, a ball screw nut fitted threadedly about the composite shaft and secured to a motor shaft, and a ball spline nut fitted about the composite shaft and secured to a motor housing. The ball spline nut, ball screw nut, and motor are arranged in the order mentioned as viewed from an attachment for a moving body which is provided at one end of the composite shaft. An angular-contact bearing which supports the motor shaft rotatably is situated closer to the ball screw nut than the motor is.

2 Claims, 4 Drawing Sheets

ELECTRIC ACTUATOR

RELATED ART STATEMENT

This invention relates to an electric actuator which is used in, for example, an arm of an industrial robot for performing a uniaxial motion.

A known electric actuator of this type is disclosed in Japanese Patent Application Laid-Open No. 62-165057. It includes a composite shaft having a screw groove and a spline groove formed together in its peripheral surface, a ball screw nut fitted about the shaft and on balls capable of rolling in the screw groove, and a ball spline nut fitted about the shaft and on balls capable of rolling in the spline groove.

The ball screw and spline nuts are rotatably fitted in a housing by ball bearings, and are rotatable independently of each other by distinct motors. The combination of the rotating motion of the ball screw nut with the rotating motion of the ball spline nut gives the composite shaft a reciprocating or rotating motion, or a spiral motion consisting of its combined reciprocating and rotating motion. For example, if the ball screw nut is rotated, while the ball spline nut is not, the composite shaft performs a reciprocating motion in either direction depending on the direction in which the ball screw nut is rotated. If the ball spline nut is rotated, while the ball screw nut is not, the shaft performs a spiral motion, while rotating in the direction in which the ball spline nut is rotated.

When the composite shaft is caused to perform a reciprocating motion, however, the self-holding force of the motor for driving the ball spline nut has to be relied upon for holding the shaft against rotation. This arrangement has been found to bring about a lowering in the accuracy with which the shaft can be positioned in the direction of its rotation.

As the driving force of each motor is transmitted to the ball spline or screw nut by a timing belt and pulleys, the repeated use of the belt results in its elongation and the loosening of the fitting between the belt and pulleys. As a result, the accuracy with which the shaft is axially advanced becomes lower with the passage of time.

As the radial rigidity of the composite shaft depends solely upon the rigidity of the ball bearings supporting the ball spline and screw nuts rotatably, there is every likelihood that the shaft may have so low a radial rigidity as to be easily displaced to an eccentric position by a radial load. The clearance which may be formed between the ball bearings and the ball spline nut is also responsible for the displacement of the shaft to an eccentric position.

OBJECT AND SUMMARY OF THE INVENTION

This invention has been made to overcome the problems of the prior art as hereinabove pointed out, and it is an object thereof to provide a compact electric actuator including a composite shaft which is of high rigidity, and can be positioned with high accuracy.

This object is attained by an electric actuator which comprises a composite shaft having a spiral ball screw groove and an axially extending ball spline groove formed in its peripheral surface, and provided at one end with an attachment for a moving body; a hollow motor including a hollow motor shaft through which the composite shaft extends, and a motor housing, the motor shaft being rotatably supported in the motor housing by a plurality of bearings, and carrying a rotor on its peripheral surface, the motor housing containing a stator surrounding the rotor; a ball screw nut connected to one end of the motor shaft, and threadedly fitted about the composite shaft and on a multiplicity of balls capable of rolling along the ball screw groove; and a ball spline nut secured to the motor housing, and fitted about the composite shaft and on a multiplicity of balls capable of rolling along the ball spline groove; the ball spline nut, ball screw nut, and motor being arranged in the order mentioned as viewed from the attachment for a moving body; the bearings surrounding the motor shaft including a standard bearing which is situated closer to the ball screw nut than the motor is, to provide a standard for the axial position of the motor shaft.

The torque imparted by the motor to the motor shaft is converted to an axial thrust by the ball nut connected to the motor shaft, and the composite shaft is caused by the thrust to perform a rectilinear motion.

The ball spline nut holds the composite shaft against rotation, and bears a radial load acting upon the composite shaft. As it is secured to the motor housing, the ball spline nut can resist a large torque acting upon the composite shaft and hold it against rotation to thereby ensure an improved accuracy with which it is positioned in the direction of its rotation.

The ball screw nut drives the composite shaft in the axial direction as a result of its own rotation, and bears an axial load acting upon the composite shaft to ensure its axial positioning. As the ball screw nut is directly connected to the end of the motor shaft, the accuracy of rotation of the motor is directly reflected on the accuracy of rotation of the ball screw nut, and the accuracy with which the composite shaft is axially moved is, therefore, improved. The improved accuracy of the axial motion of the composite shaft is enhanced by the smooth rotation of the motor shaft, since the composite shaft extends through the motor shaft, ball screw nut, and ball spline nut coaxially therewith.

According to a preferred aspect of this invention, the ball screw nut forms an integral part of the motor shaft, so that its longitudinal axis may perfectly coincide with that of the motor shaft. This arrangement enables a further improvement in the accuracy of rotation of the ball screw nut and thereby the accuracy of the axial motion of the composite shaft.

As the composite shaft extends through the motor shaft, it appears that the axial expansion of the composite shaft which is caused by the heat of the motor may have an adverse effect on the accuracy of axial motion of the attachment for a moving body which is provided on the composite shaft for mounting e.g. work.

According to this invention, however, the ball spline nut, ball screw nut, and motor are arranged in the order mentioned as viewed from the attachment for a moving body, and the ball nut which defines a standard for the axial positioning of the composite shaft is, therefore, situated between the attachment and the motor. One of the bearings by which the motor shaft is rotatably supported serves as a standard bearing for determining the axial position of the motor shaft, and is situated closer to the ball screw nut than the motor is.

Therefore, it is unlikely that the axial expansion of the motor shaft and composite shaft by the heat of the motor may adversely affect the accuracy of axial motion of the attachment for a moving body.

DETAILED DESCRIPTION OF THE PREFERRED EMBODIMENTS

The electric actuator of this invention will now be described in detail with reference to the accompanying drawings.

Figure 1:
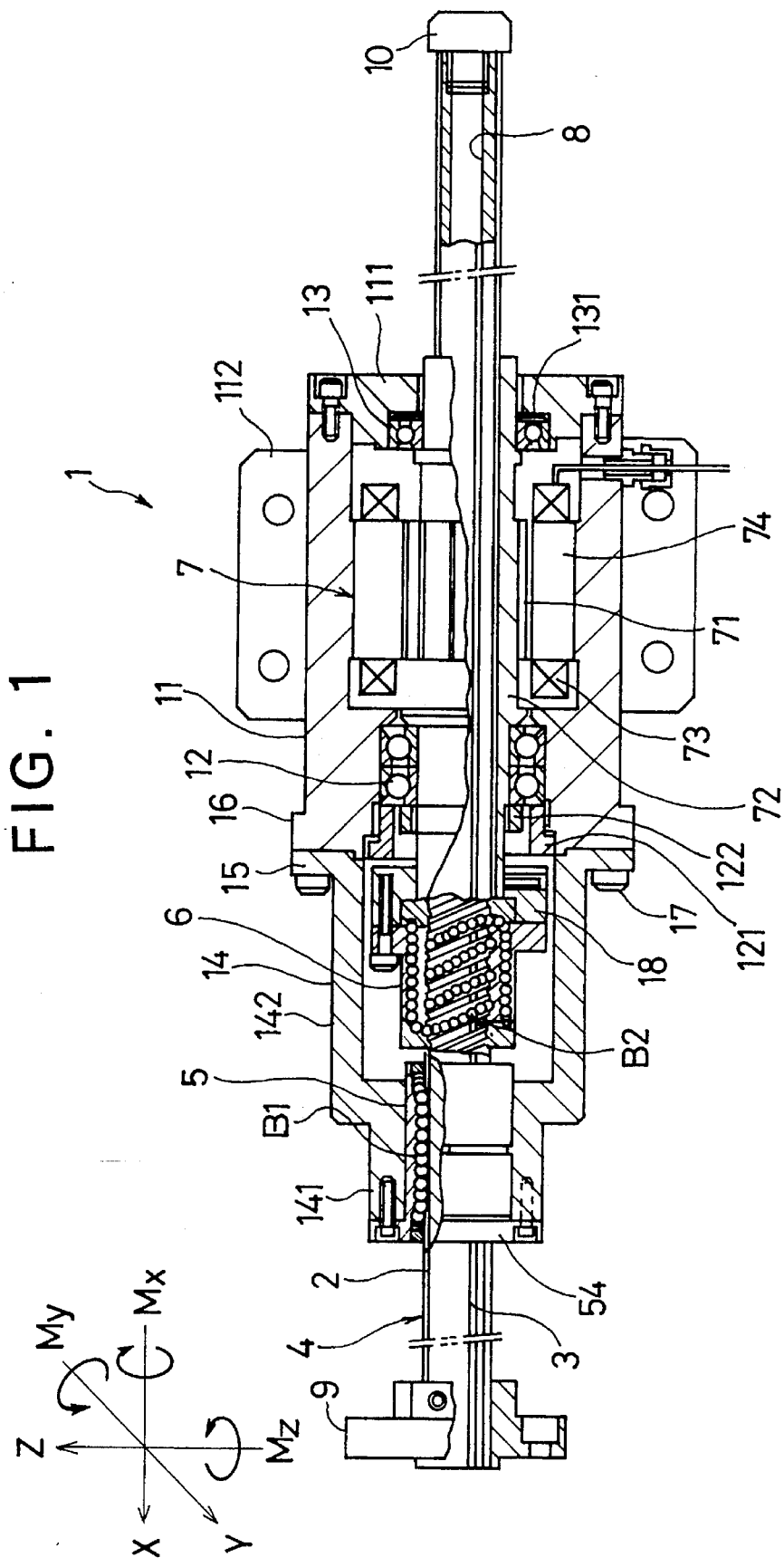
FIG. 1 is a longitudinal sectional view of an electric actuator embodying this invention.

FIG. 1 shows an electric actuator embodying this invention. The electric actuator 1 includes a composite shaft 4 having a spiral ball screw groove 2 and an axially extending ball spline groove 3 formed in its outer peripheral surface. A ball spline nut 5, a ball screw nut 6 and a hollow motor 7 are fitted about the composite shaft 4 coaxially therewith. The ball spline nut 5, ball screw nut 6, and motor 7 are arranged in the order mentioned as viewed from that end of the composite shaft 4 at which a load will act upon it.

The composite shaft 4 has an axial bore 8 making it light in weight, and is provided at one end with an attachment 9 for a moving body which is employed for mounting e.g. a finger. The attachment 9 is situated at that end of the composite shaft 4 at which a load will act upon it. The bore 8 can be used as a passage for housing electric wiring for a moving body, such as a finger, or hydraulic or pneumatic piping. The other end of the composite shaft 4 is normally closed by a blind lid 10.

Figure 2A:
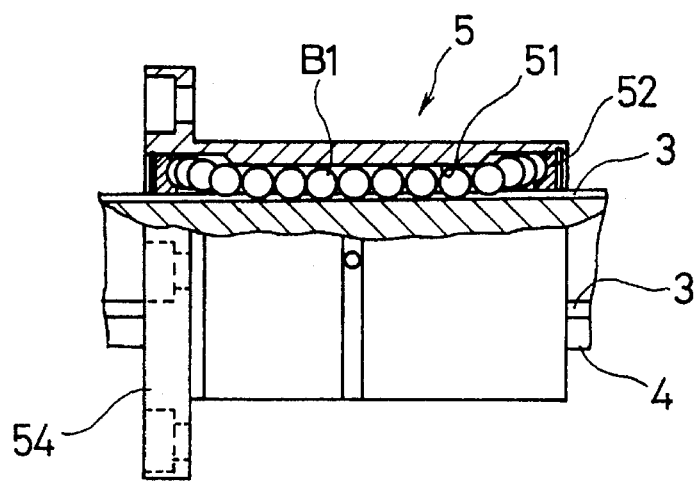
FIG. 2 shows a ball spline nut fitted about a composite shaft, and consists of (a) a front elevational view, partly in section, of the nut, (b) a top plan view of a ball circulating path, and (c) a side elevational view, partly in section, of the nut.
Figure 2B:
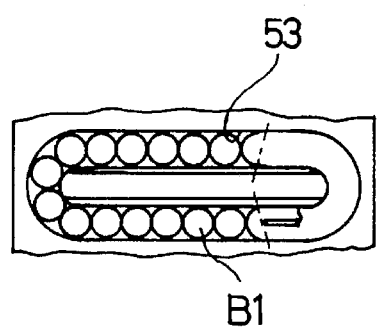
Figure 2C:
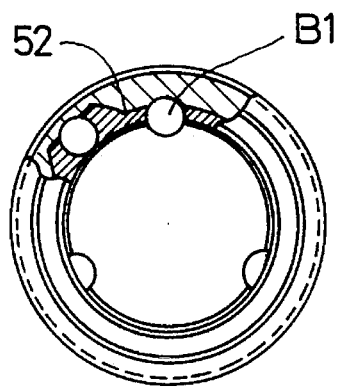

Referring to FIG. 2, the ball spline nut 5 is cylindrical, and has a ball rolling groove 51 formed in its inner peripheral surface along the ball spline groove 3 of the composite shaft 4. A multiplicity of load-bearing balls B1 are rollably held between the ball spline groove 3 and the ball rolling groove 51. The ball spline nut 5 contains a holder 52 along its inner periphery. The holder 52 has a plurality of ball circulating paths 53, so that the balls B1 which have been rolling in a loaded zone may be circulated into an unloaded zone defined between the outer periphery of the holder 52 and the inner periphery of the ball spline nut 5.

The balls B1 are preloaded. They can be preloaded by, for example, forming the ball spline groove 3 and the ball rolling groove 51 in such a way that their circumferential phases may differ from each other. The preloaded balls enable the composite shaft 4 to be held against displacement out of position relative to the ball spline nut 5 not only in the radial direction, but in the direction of rotation as well.

Figure 3A:
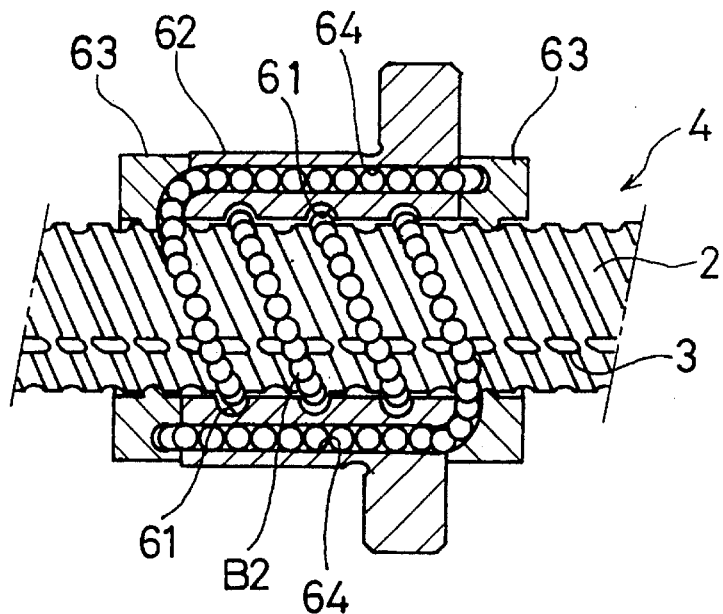
FIG. 3 shows a ball screw nut engaged threadedly about the composite shaft, and consists of (a) a longitudinal sectional view of the nut, and (b) a side elevational view thereof.
Figure 3B:
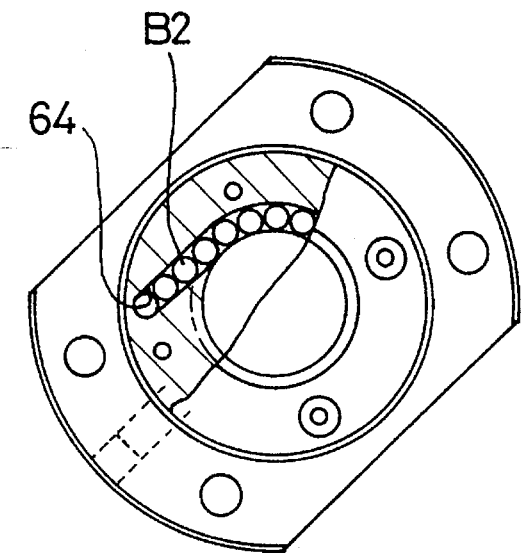

The ball screw nut 6 comprises a main body 62 and a pair of end caps 63 attached to the opposite ends, respectively, of the main body 62, as shown in FIG. 3. The main body 62 is substantially cylindrical, and has a ball screw groove 61 formed in its inner peripheral surface along the ball screw groove 2 formed in the outer peripheral surface of the composite shaft 4. The main body 62 has a ball escape hole 64 for circulating balls B2 interposed between the composite shaft 4 and the nut 6, while each end cap 63 has a direction changing path 65 which enables the balls B2 rolling along the ball screw groove of the composite shaft 4 to escape into the ball escape hole 64. The opposite ends of the ball screw groove 61 are connected by the ball escape hole 64 and the direction changing paths 65 to define an endless circulating path for the balls B2.

The balls B2 which roll between the composite shaft 4 and the ball screw nut 6 are preloaded by forming the ball screw grooves 2 and 61 in such a way that their leads may differ from each other. The preloaded balls enable the composite shaft 4 to be held against displacement out of position relative to the ball screw nut 6 not only in the radial direction, but in the direction of rotation as well. The balls can alternatively be preloaded by interposing a washer, or spring between a pair of nuts each having a ball screw groove.

The hollow motor 7 comprises a hollow motor shaft 72 through which the composite shaft 4 extends, and a motor housing 11 in which the motor shaft 72 is rotatably supported. The motor shaft 72 carries a rotor 71 secured to its periphery, and the motor housing 11 contains a stator 74 facing the rotor 71 in an appropriately spaced apart relation from it.

The motor shaft 72 is rotatably supported by a first bearing 12 and a second bearing 13 in the motor housing 11. The first and second bearings 12 and 13 support the motor shaft 72 at the journals formed on the opposite sides of the rotor 71. The first bearing 12 is situated close to the ball screw nut 6 and is a double-row angular-contact ball bearing, while the second bearing 13 is a single-row ball bearing.

The first bearing 12 has an outer race secured to the motor housing 11 by a first retaining ring 121 engaged in the motor housing 11 at one end thereof, and an inner race secured to the motor shaft 72 by a second retaining ring 122 engaged about it. The second bearing 13 is fitted in a cover 111 closing the opening of the motor housing 11, and is axially retained by a spring 131. The motor housing 11 has a mounting bracket 112.

The ball spline nut 5 is fitted in a spline casing 14 and has a flange 54 secured by bolts to one end of the spline casing 14. The spline casing 14 has a flange 15 at the other end thereof, and the motor housing 11 has a flange 16 contacting the flange 15. The flanges 15 and 16 are secured together by bolts 17. The spline casing 14 has a small-diameter portion 141 in which the ball spline nut 5 is secured, and a large-diameter portion 142 surrounding the ball screw nut 6, and terminating in the flange 15.

The ball screw nut 6 is firmly connected to one end of the motor shaft 72 by a coupling ring 18, so that the rotation of the motor shaft 72 may be directly transmitted to the ball screw nut 6.

If the motor 7 is started, the motor shaft 72 is rotated, and its rotation is transmitted to the ball screw nut 6 and converted thereby to a thrust for driving the composite shaft 4 axially. The reaction force of the thrust is borne by the first bearing 12, and the composite shaft 4 performs an axial rectilinear motion. It is, therefore, the ball screw nut 6 and the first bearing 12 that provide a standard for the positioning of the composite shaft 4.

A coil 73 wound on the stator 74 generates heat during the operation of the motor 7, and its heat is transmitted to the composite shaft 4 through the rotor 71 and the motor shaft 72 and causes its portion surrounded by the stator 74 to be elongated by thermal expansion. The elongation of the composite shaft 4 does, however, not exert any appreciable effect on the accuracy of axial motion of the attachment 9 for a moving body, since it occurs on the opposite side of the ball screw nut 6 and the first bearing 12, which provide a standard for the positioning of the composite shaft 4, from the attachment 9, as the ball screw nut 6 and the first bearing 12 are situated closer to the attachment 9 than the stator 74 is.

The first bearing 12 is situated between the ball screw nut 6 and the stator 74, and the ball screw nut 6 is sufficiently spaced apart from the stator 74 to minimize any undesirable effect of such heat. That portion of the motor shaft 72 which exists between the ball screw nut 6 and the first bearing 12 is also sufficiently spaced apart from the stator 74 not to be undesirably affected by the heat of the stator 74 and change in length.

The axial load acting upon the composite shaft 4 is borne by the ball screw nut 6, and the torque acting upon the composite shaft 4 is borne by the ball spline nut 5. The radial and momental loads acting upon the composite shaft 4 are both borne by both the ball spline and screw nuts 5 and 6. Therefore, it is possible to position a finger, or other moving body mounted to the attachment 9, though not shown, accurately in any of the directions of X, Y and Z axes, and moments Mx, My and Mz about those axes. The positioning of the moving body in the direction of the X, Y or Z axis refers to its coordinate position in a three-dimensional space, while its positioning in the direction of the moment Mx, My or Mz refers to its posture in a particular coordinate position.

The ball spline nut 5 is directly attached to the spline casing 14 to hold the composite shaft 4 against rotation by bearing any radial load acting upon it, so that there is no clearance therebetween in the direction of rotation, or in the radial direction.

The direct attachment of the ball spline nut 5 to the spline casing 14 enables the device to be compact in construction and high in torsional rigidity. As the ball screw nut 6 is attached to the end of the hollow motor shaft 72, it is possible to diminish any rotating part of the device in diameter .and minimize any moment of inertia, so that the device may quickly respond to any order for stopping its motion.

Figure 4:
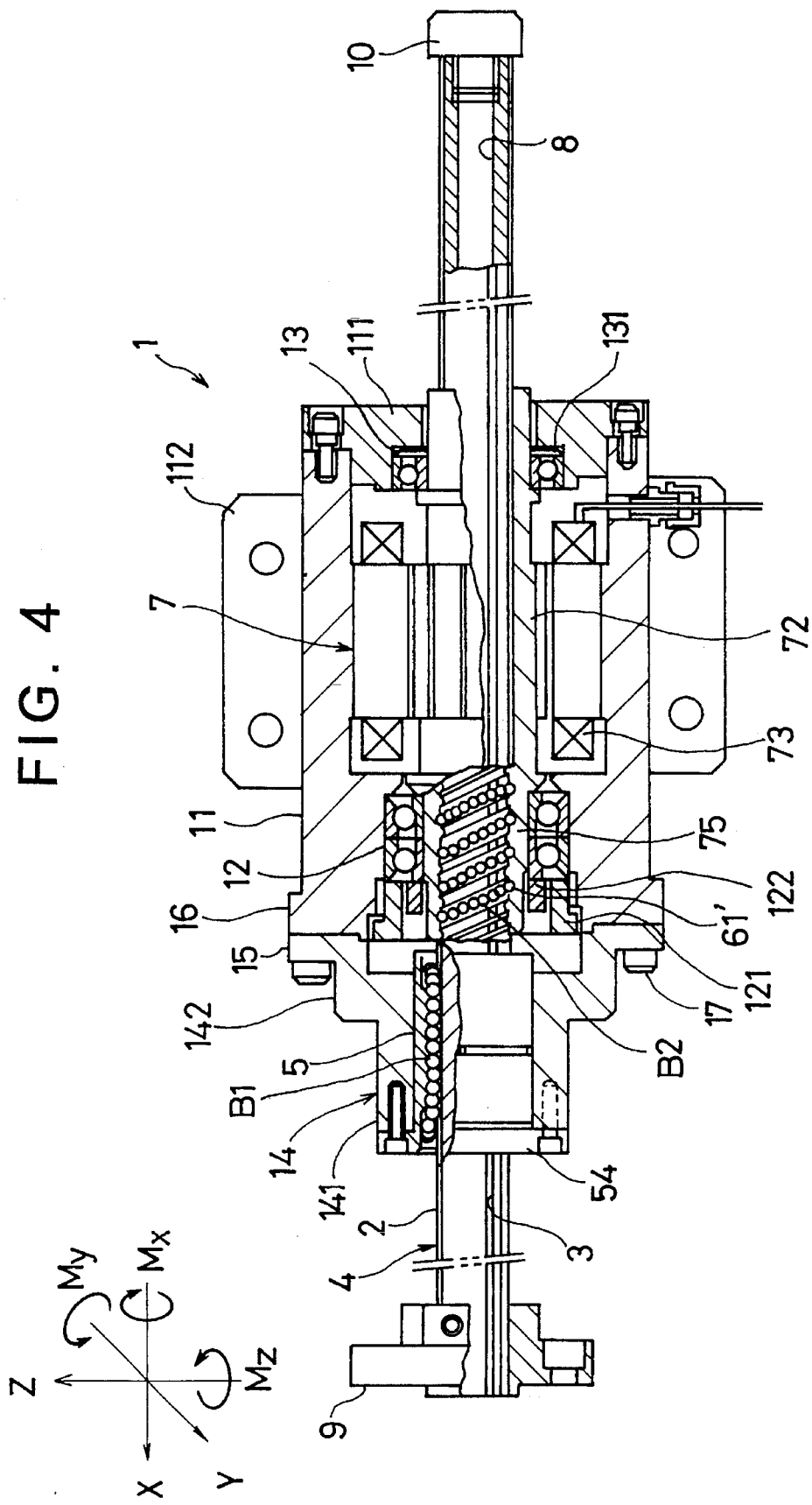
FIG. 4 is a longitudinal sectional view of an electric actuator according to a second embodiment of this invention.

FIG. 4 shows a second embodiment of this invention. This device is obtained if the ball screw nut in the device as hereinabove described is so formed as to form an integral part of the hollow motor shaft. The motor shaft 72 has an extension 75 having a ball screw groove 61' formed in its inner peripheral surface, and balls B2 are rollably held between tire ball screw groove 2 of the composite shaft 4 and the ball screw groove 61'. In any other respect, it is identical in construction to the device as hereinbefore described, and no repeated description thereof is made, as like numerals are used to denote like parts throughout the drawings.

What is claimed is:

1. An electric actuator comprising:

a composite shaft having a spiral ball screw groove and an axially extending ball spline groove formed in its outer peripheral surface, and provided at one end with an attachment for a moving body;

a hollow motor including a hollow motor shaft through which said composite shaft extends, a motor housing in which said motor shaft is rotatably supported by a plurality of bearings, a rotor carried on the outer peripheral surface of said motor shaft, and a stator contained in said motor housing and surrounding said rotor;

a ball screw nut connected to one end of said motor shaft for rotation therewith, and fitted threadedly about said composite shaft and on a multiplicity of balls capable of rolling along said ball screw groove; and a ball spline nut fixedly secured to said motor housing, and fitted about said composite shaft and on a multiplicity of balls capable of rolling along said ball spline groove;

said ball spline nut, ball screw nut, and motor being arranged in the order mentioned as viewed from said attachment;

said motor shaft-supporting bearings including a fixed standard bearing and an axially movable bearing disposed on opposite sides of said motor, said fixed standard bearing being disposed intermediate said ball screw nut and said motor and being situated closer to said ball screw nut than said motor to provide a standard for the axial position of said motor shaft, and said movable bearing being spring-biased axially toward said motor.

2. An electric actuator as set forth in claim 1, wherein said ball screw nut forms an integral part of said motor shaft.

* * * * *